(12) United States Patent
    Paulos et al.

(10) Patent No.: US 10,560,034 B2
(45) Date of Patent: Feb. 11, 2020

(54) AC-TO-DC CHARGE PUMP HAVING A CHARGE PUMP AND COMPLIMENTARY CHARGE PUMP

(71) Applicant: RFMicron, Inc., Austin, TX (US)

(72) Inventors: John J. Paulos, Austin, TX (US); Shahriar Rokhsaz, Austin, TX (US)

(73) Assignee: RFMicron, Inc., Austin, TX (US)

( * ) Notice: Subject to any disclaimer, the term of this patent is extended or adjusted under 35 U.S.C. 154(b) by 0 days.

(21) Appl. No.: 15/658,000

(22) Filed: Jul. 24, 2017

(65) Prior Publication Data

US 2017/0324349 A1 Nov. 9, 2017

Related U.S. Application Data

(63) Continuation of application No. 13/732,263, filed on Dec. 31, 2012, now Pat. No. 9,716,441.

(60) Provisional application No. 61/583,245, filed on Jan. 5, 2012.

(51) Int. Cl.
    *H02M 3/07* (2006.01)
    *H02M 7/10* (2006.01)

(52) U.S. Cl.
    CPC ............ *H02M 7/103* (2013.01); *H02M 3/07* (2013.01)

(58) Field of Classification Search
    None
    See application file for complete search history.

(56) References Cited

U.S. PATENT DOCUMENTS

| | | | |
|---|---|---|---|
| 9,716,441 B2 * | 7/2017 | Paulos | H02M 7/103 |
| 2007/0018743 A1 * | 1/2007 | Sheng | H03J 1/005 331/177 V |
| 2007/0046369 A1 * | 3/2007 | Schober | G06K 19/0707 330/7 |
| 2007/0097044 A1 * | 5/2007 | Yang | H05B 33/0815 345/82 |

* cited by examiner

*Primary Examiner* — Jeffrey A Gblende
(74) *Attorney, Agent, or Firm* — Garlick & Markison; Timothy W. Markison

(57) ABSTRACT

An improved AC-to-DC charge pump for use, for example, in voltage generation circuits. In one embodiment, two 2-diode charge pumps are coupled in back-to-back configuration, and adapted to develop a substantially stable voltage on a mid-level rail. In one other embodiment, two 3-diode charge pumps are coupled in back-to-back configuration, and adapted also to develop a substantially stable voltage on a mid-level rail. In one preferred embodiment, all diodes are implemented as current-source-biased MOSFETs.

10 Claims, 4 Drawing Sheets

AC-TO-DC CHARGE PUMP HAVING A CHARGE PUMP AND COMPLIMENTARY CHARGE PUMP

CROSS-REFERENCE TO RELATED APPLICATIONS

The present U.S. Utility patent application claims priority pursuant to 35 U.S.C. § 120 as a continuation of U.S. Utility application Ser. No. 13/732,263, entitled "AC-TO-DC CHARGE PUMP HAVING A CHARGE PUMP AND COMPLIMENTARY CHARGE PUMP", filed Dec. 31, 2012, issuing as U.S. Pat. No. 9,716,441 on Jul. 25, 2017, which claims priority pursuant to 35 U.S.C. § 119(e) to U.S. Provisional Application No. 61/583,245, entitled "METHOD AND APPARATUS FOR VARYING AN IMPEDANCE", filed Jan. 5, 2012, all of which are hereby incorporated herein by reference in their entirety and made part of the present U.S. Utility patent application for all purposes.

The subject matter of this application is related to application Ser. No. 13/209,420, filed on Aug. 14, 2011 ("Related Co-application"), now U.S. Pat. No. 8,749,319 issued on Jun. 10, 2014.

BACKGROUND OF THE INVENTION

1. Field of the Invention

The present invention relates generally to voltage generation circuits used in integrated circuits, and, in particular, to charge pump voltage generation circuits.

2. Description of the Related Art

In general, in the descriptions that follow, I will italicize the first occurrence of each special term of art that should be familiar to those skilled in the art of integrated circuits ("ICs") and systems. In addition, when I first introduce a term that I believe to be new or that I will use in a context that I believe to be new, I will bold the term and provide the definition that I intend to apply to that term. In addition, throughout this description, I will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, I may refer to the mutually exclusive Boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

In general, a charge pump performs power conversion. In particular, an AC-to-DC charge pump draws power from an alternating current ("AC") source to develop one or more direct current ("DC") power supplies for load circuitry. Typically, the regulation for these power supplies is not within the charge pump proper. Rather, regulation is often provided by a regulator which will spill excess current so as to maintain a steady DC supply voltage.

Shown in FIG. 1 is a typical integrated system 10 comprising antenna 12, tank circuit 14, AC-to-DC charge pump 16, DC regulator 18, and an exemplary load circuit 20. As is known, to be most efficient, the resonant frequency of the tank circuit 14 must be tuned to the carrier frequency of a received radio frequency ("RF") signal. One effective technique for dynamically tuning the resonant frequency is disclosed in the Related Co-Application.

During operation, as the charge pump 16 draws more current from the tank circuit 14, the Q will drop, and the available antenna voltage will decrease. Ultimately, the current which can be supplied by the charge pump 16 is limited by the RF power received by the antenna 12.

The primary requirement of charge pump 16 is to achieve the targeted supply voltage from the smallest possible antenna signal (high gain) at the highest possible efficiency. High gain is not required simply because the antenna signal is small. Unloaded, the very high Q of the tank circuit 14 can easily achieve voltages in excess of several volts. As the charge pump 16 is energized, the load 20 will pull current from the antenna 12 through the charge pump 16. The effective input impedance of the charge pump 16 will decrease, causing the Q of the system 10 to drop until the input voltage stabilizes at the input voltage that will just support the current drawn by the regulator 18 and the load 20. The higher the gain of the charge pump 16, the smaller the input signal required to sustain the circuit load.

Shown in FIG. 2 is a prior art 2-diode (i.e., second-order) charge pump 16a, comprising capacitors 22 and 24, and diodes 26 and 28. The idealized output voltage of charge pump 16a is:

$$V_O = 2*(V_p - V_d) \quad [\text{Eq. 1}]$$

where $V_p$ is the (peak-differential) input voltage and $V_d$ is the forward diode drop of diodes 26 and 28. The derivation is left to the reader. A somewhat more accurate expression for the output voltage is:

$$V_o = 2*(a*V_p - V_d) \quad [\text{Eq. 2}]$$

where a is the AC-coupling gain (hereinafter referred to as "coupling efficiency") from the $V_{INP}$ input to the node 30 (hereinafter referred to as a "flying node"). For convenience of reference, we shall hereinafter refer to any node having a voltage that is substantially static with respect to $V_{SS}$ as a "fixed bias node". Since $V_{SS}$ is static with respect to itself, $V_{SS}$ is, by this definition, a fixed bias node.

The input capacitor 22 should clearly be chosen to make a very close to 1. We can see that:

$$V_p \min = \frac{1}{a} * \left( \frac{V_o}{2} + V_d \right) \quad [\text{Eq. 3}]$$

Even with $V_d$~0, the 2-diode charge pump 16a would require an input of at least $$\left( \frac{1}{a} \right) * \frac{V_0}{2},$$

or about 1 $V_p$ to sustain a 1.8 V output.

To a good approximation, on each cycle all of the load current (for that cycle) is drawn through both diodes, and the load current is pulled from $V_{in}$ twice (once each half cycle) while $V_{in}$ is at its maximum ($V_P$). Therefore, neglecting a, the total power drawn from the input is:

$$P_{in} = 2*V_p*I_{load} \quad [\text{Eq. 4}]$$

Also, the total power lost in charge pump 16a (the power dissipated in the diodes during forward conduction) is approximately:

$$P_d = 2*V_d*I_{load} \quad \text{[Eq. 5]}$$

Finally, the power delivered to the load is:

$$P_l = V_o * I_{load} \quad \text{[Eq. 6]}$$

and the power efficiency is:

$$PE = \frac{P_l}{P_{in}} = 1 - \frac{V_o}{(2*V_p)} = \frac{V_o}{(V_o + (2*V_d))} \quad \text{[Eq. 7]}$$

Clearly, to maximize efficiency you must minimize the forward drops of diodes 26 and 28.

Shown in FIG. 3 is a prior art 3-diode (i.e., third-order) charge pump 16b, comprising capacitors 32, 34 and 36 and diodes 38, 40 and 42, with a flying node 44. The analysis of this circuit is a bit more complex, but it can be shown that:

$$V_o = 3*(V_p - V_d) \quad \text{[Eq. 8]}$$

$$V_p \min = \frac{V_o}{3} + V_d \quad \text{[Eq. 9]}$$

$$PE = \frac{V_o}{(3*V_p)} = \frac{V_o}{(V_o + (3*V_d))} \quad \text{[Eq. 10]}$$

As can be seen, for higher-order charge pumps, the minimum input voltage is reduced at the cost of decreasing efficiency.

Both the 2-diode and the 3-diode charge pumps suffer from a practical problem, which is that with $V_{INN}$ tied to $V_{SS}$, $V_{INP}$ swings $V_p$ above and below $V_{SS}$. If $V_{SS}$ is tied to the substrate, $V_{INP}$ will tend to forward bias all substrate diodes on $V_{INP}$ on the down swing, unless the $V_p$ required to reach the target output voltage is very small indeed.

I submit that what is needed is an improved charge pump that provides improved power efficiency while overcoming the problems discussed above.

BRIEF SUMMARY OF THE INVENTION

In accordance with a preferred embodiment of my invention, I provide an AC-to-DC charge pump having a first pump comprising a first pair of diodes, and a second pump comprising a second pair of diodes, with the first and second pumps being coupled back-to-back, i.e., complementary, and adapted to develop a substantially stable voltage on a mid-level output.

In accordance with an alternate embodiment of my invention, I provide an AC-to-DC charge pump having a first pump comprising a first trio of diodes, and a second pump comprising a second trio of diodes, with the first and second pumps being coupled back-to-back and adapted to develop a substantially stable voltage on a mid-level output.

In accordance with another embodiment of my invention, I provide an AC-to-DC charge pump having at least a second-order pump adapted to develop a first stage voltage and a second stage voltage, the second stage voltage being greater than the first stage voltage. A series-pass regulator is adapted to develop with respect to the first stage voltage a supply as a function of a reference voltage less than the first stage voltage.

BRIEF DESCRIPTION OF THE SEVERAL VIEWS OF THE DRAWINGS

My invention may be more fully understood by a description of certain preferred embodiments in conjunction with the attached drawings in which.

Figure 1:
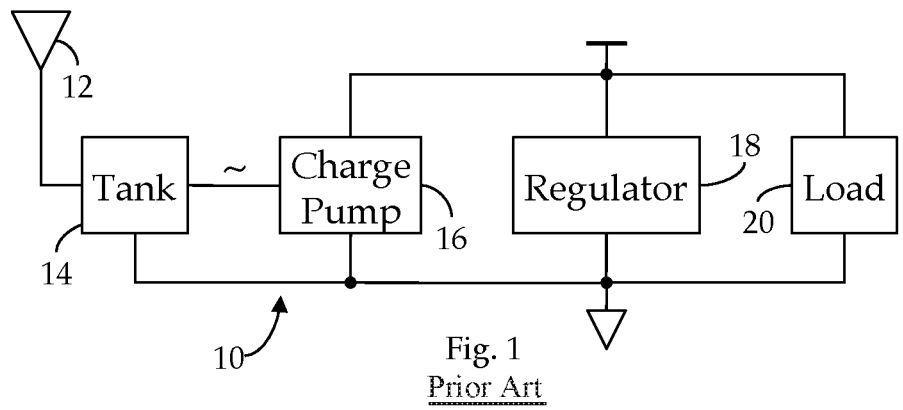
FIG. 1 illustrates, in block diagram form, a typical integrated system.

In the drawings, similar elements will be similarly numbered whenever possible. However, this practice is simply for convenience of reference and to avoid unnecessary proliferation of numbers, and is not intended to imply or suggest that my invention requires identity in either function or structure in the several embodiments.

DETAILED DESCRIPTION OF THE INVENTION

Figure 4:
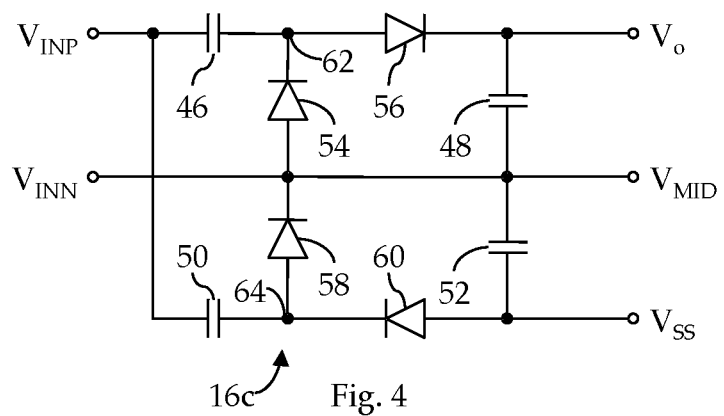
FIG. 4 illustrates, in schematic diagram form, a 4-diode charge pump constructed in accordance with one embodiment of my invention.

Shown in FIG. 4 is a 4-diode charge pump 16c constructed in accordance with my invention. In general, my charge pump 16c comprises capacitors 46, 48, 50 and 52, and diodes 54, 56, 58 and 60, with flying nodes 62 and 64. In effect, this configuration consists of a complementary pair of substantially independent 2-diode charge pumps arranged back-to-back, with $V_{INN}$ tied to a middle rail, $V_{MID}$. During operation, $V_{MID}$ will tend to settle to $V_o/2$, and $V_{SS}$ will be pumped below $V_{INN}$. As a result, while $V_{INN}$ will appear stationary with respect to $V_{SS}$, $V_{INN}$ and $V_{INP}$ will share a common-mode voltage which is $V_{MID}$, i.e., approximately $V_o/2$. As a result, the forward biasing of substrate diodes is substantially eliminated. In addition, tuning of the tank 14 will be much easier to manage.

Figure 5:
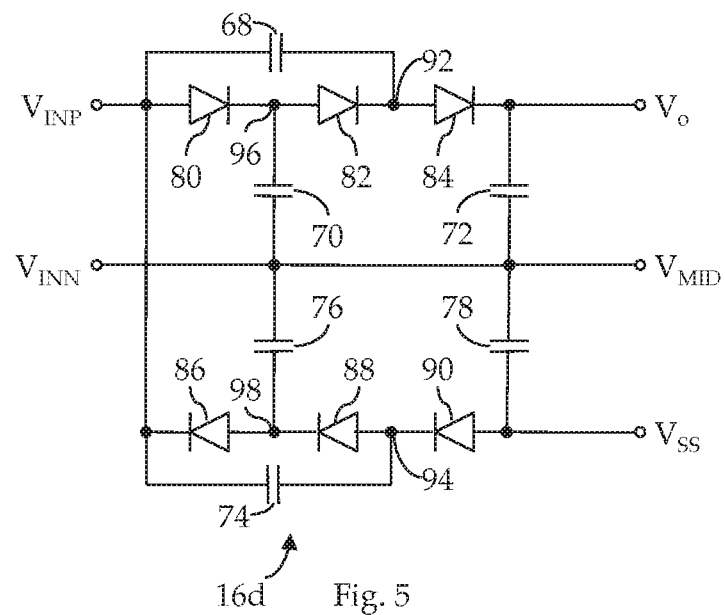
FIG. 5 illustrates, in schematic diagram form, a 6-diode charge pump constructed in accordance with one other embodiment of my invention.

Shown in FIG. 5 is a 6-diode charge pump 16d constructed in accordance with my invention. In general, my charge pump 16d comprises capacitors 68, 70, 72, 74, 76 and 78, and diodes 80, 82, 84, 86, 88 and 90, with flying nodes 92 and 94, and fixed bias nodes 96 and 98. In effect, this configuration consists of a pair of 3-diode charge pumps arranged back-to-back, with $V_{INN}$ tied to a middle rail, $V_{MID}$. During operation, $V_{MID}$ will tend to settle to $V_o/2$, and $V_{SS}$ will be pumped below $V_{INN}$ As a result, while $V_{INN}$ will appear stationary with respect to $V_{SS}$, $V_{INN}$ and $V_{INP}$ will share a common-mode voltage which is $V_{MID}$, i.e., approximately $V_o/2$. As a result, the forward biasing of substrate diodes is substantially eliminated. In addition, tuning of the tank 14 will be much easier to manage.

My 4-diode charge pump 16c and 6-diode charge pump 16d are made significantly more efficient through the use of current-source-biased MOSFET diodes, which make it possible to reduce the forward "diode" drops to less than 200 mV. The current-source biasing used here is an extension of work by X. Wang et al., "A high efficiency AC-DC charge pump using feedback compensation technique," Proc. of the IEEE Asian Solid-State Circuits Conf., Nov. 12-14, 2007, Jeju, Korea, pp. 252-255 ("Wang"). Consider diode 84—if implemented as a conventional, diode-connected N-channel MOSFET, the forward drop of this diode would be in excess of 0.8 V due to the body effect on the N-channel threshold voltage. Using a "Medium" $V_t(M-V_t)$ device, this drop might come down to 0.65 V. A better solution is to use a P-channel MOSFET with source, bulk (i.e., the N-well) and gate connected to $V_o$. With this connection, forward conduction occurs when the drain rises above the common source-bulk-gate connection. Not only is there no body effect enhancement of the threshold voltage, the threshold voltage is actually suppressed somewhat by a negative body effect as the drain effectively becomes the source and $V_{sb}$ becomes greater than 0. Note that there is no need to do active switching of the N-well between the source/drain terminals as they exchange roles (as suggested by Wang) because the forward "diode" drop of the MOSFET (roughly equal to $|V_t|$) is less than the forward bias required to appreciably turn on the body diode. Using a M–$V_t$ P-channel device in its own N-well reduces the forward drop to around 350 mV.

Figure 6:
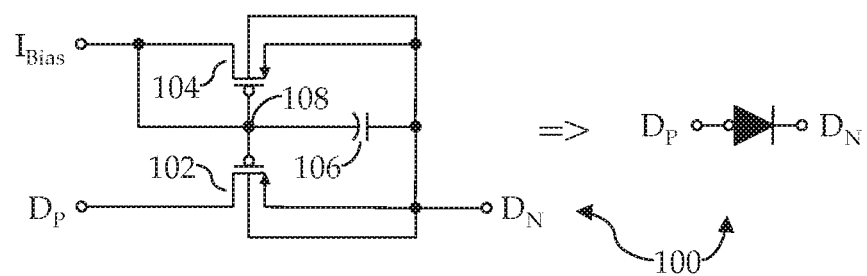
FIG. 6 illustrates, in schematic diagram form, a current-source-biased P-channel MOSFET diode adapted for use in my invention.

Now consider the current-source-biased P-channel MOSFET diode 100 of FIG. 6, comprising P-channel MOSFET transistor 102 (referred to hereinafter as a "diode transistor"), P-channel MOSFET transistor 104 (referred to hereinafter as a "bias transistor") and a capacitor 106 coupled between node 108 and the "cathode-end" of the P-channel MOSFET diode 100 (the symbol I prefer to use to represent such a diode is also shown in FIG. 6). In the absence of bias current, the source-to-gate voltage of bias transistor 104 will collapse to zero due to leakage, leaving the diode transistor 102 with effectively a common source-bulk-gate connection, as described above. However, in the presence of a small positive bias current (i.e., leaving the diode 100), the source-to-gate voltage of the bias transistor 104 will increase, providing a partial bias for the diode transistor 102. There are two points to note. First, the partial bias for the diode transistor 102 must be small enough to keep reverse leakage currents to a minimum. Reverse leakage currents introduce a power dissipation term in the diode 100 when it should ideally have zero current. In addition, any current which leaks backwards through the diode 100 must be replaced on the next forward cycle, again adding to power loss in the diode 100. Second, capacitor 106 needs to be quite large to stabilize the gate bias. For example, considering my charge pump 16d, as $V_{INP}$ swings and couples into node 92 (see, FIG. 5), that swing of $2*V_P$ couples through the gate-to-drain capacitance of the diode transistor 102 into the gate bias node 108. Unfortunately, this coupling is in exactly the wrong direction. As node 92 swings down (diode transistor 102 is off), this coupling increases the source-to-gate bias increasing the reverse leakage. As node 92 swings up, this coupling reduces the source-to-gate bias, robbing the diode transistor 102 of the desired bias effect. Fortunately, there is little downside to a large capacitor 106 as the parasitic capacitance of this capacitor (preferably implemented as an RF varactor) will preferably be associated with, i.e., coupled to, a fixed bias node, $D_N$, stabilized by a large capacitor. For example, in FIG. 5, nodes 96, 98 and $V_O$ are all fixed bias nodes, so that diodes 80, 84 and 88 may each be replaced with a respective P-channel MOSFET diode 100.

Figure 7:
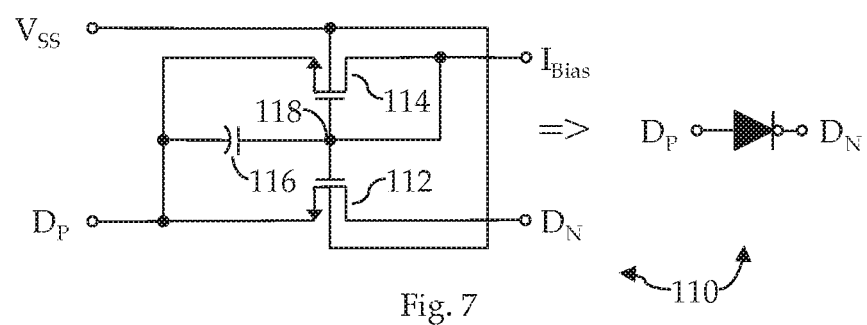
FIG. 7 illustrates, in schematic diagram form, a current-source-biased N-channel MOSFET diode adapted for use in my invention.

Now consider the diode 82 (see, FIG. 5). In this position, the N-well (and all of the parasitic capacitance associated with it) loads flying node 92, which swings (a*2*V) from peak to trough and back again during each cycle. In this position, the parasitic capacitance directly degrades the coupling efficiency a, which has a serious detrimental impact on the gain and efficiency of the charge pump 16d. This problem can be solved by using a current-source-biased N-channel MOSFET diode 110, comprising N-channel MOSFET diode transistor 112, N-channel MOSFET bias transistor 114, and capacitor 116 coupled between node 118 and the "anode-end" of the N-channel MOSFET diode 110 (the symbol I prefer to use to represent such a diode is also shown in FIG. 7). As a result of substituting N-channel MOSFETs, the common source-gate node is to the "P-side" (i.e., the "anode-side") of diode 82. Accordingly, diode 82 turns on when the "drain" at node 92 swings below the "source" at node 96. The N-channel diode transistor 112 would ordinarily suffer from a large forward drop due to body effect enhancement of the threshold voltage. Fortunately, this body effect is shared by the bias transistor 114, so the partial gate-to-source bias will effectively remove the enhanced threshold voltage of the diode transistor 112. Also, by implementing diode 82 as an N-channel diode 110, the parasitic capacitance associated with the large bias capacitor 116 appears on node 96, which, like Vo, is a fixed bias node with a large capacitor 70. Furthermore, in FIG. 5, since nodes 98 and $V_{SS}$ are also fixed bias nodes, diodes 86 and 90 may also be replaced with a respective N-channel MOSFET diode 110.

Figure 8:
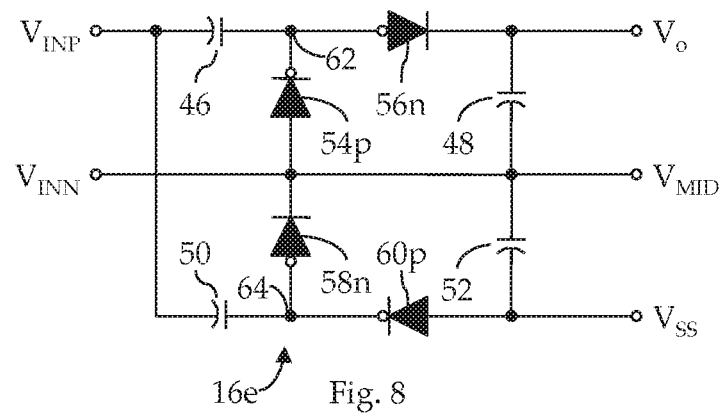
FIG. 8 illustrates, in schematic diagram form, a full implementation of my 4-diode charge pump using current-source-biased MOSFET diodes.

A complete 4-diode charge pump 16e is shown in FIG. 8 where I have used my custom diode symbols (see, FIG. 6 and FIG. 7). The capacitors 46 and 50 are preferably implemented as RF varactor capacitors of roughly 1 pF. The bottom-plate parasitic capacitance of these capacitors is coupled to the input ($V_{INP}$) to allow maximum coupling into nodes 62 and 64. This parasitic capacitance will appear directly as an input capacitance term given the much larger decoupling capacitors which provide a return path from $V_{SS}$ to $V_{INN}$. The two large capacitors to $V_{INN}$ (48 and 52) are preferably also implemented as RF varactors to achieve high capacitance density with low series resistance. The size of these "fast" capacitors at the output nodes (between $V_o$ and $V_{INN}$, and $V_{INN}$ and $V_{SS}$) is critical to achieving the best possible efficiency. I have empirically determined that roughly 20 pF each was required to capture 99% of the potential gain and efficiency. Sizing of the diode transistors is a trade-off between the lower $V_d$ achieved with increased width versus degradation of the AC coupling into nodes 62 and 62 which occurs with larger devices.

Figure 9:
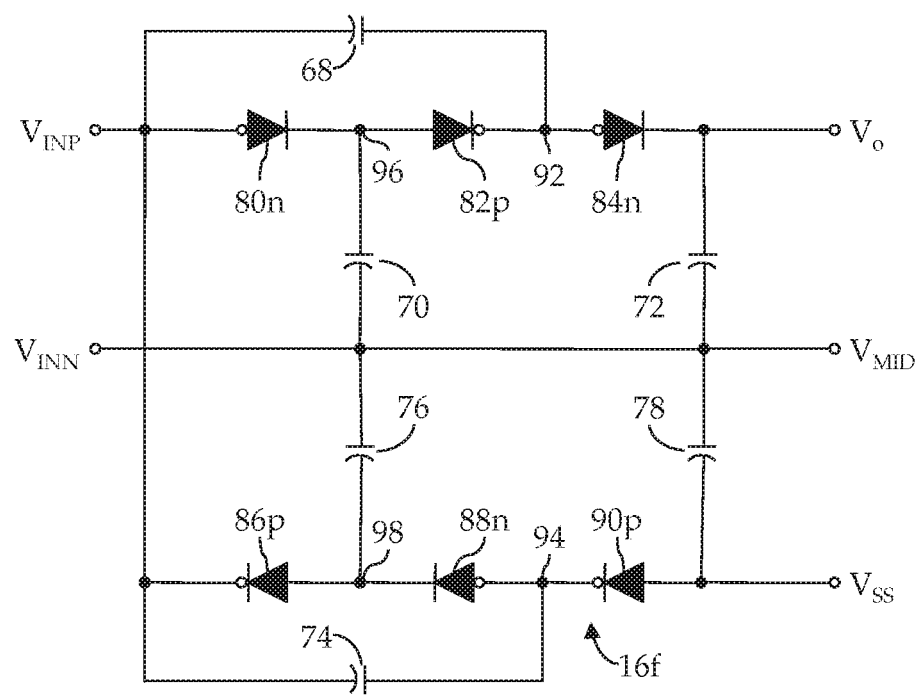
FIG. 9 illustrates, in schematic diagram form, a full implementation of my 6-diode charge pump using current-source-biased MOSFET diodes.
Figure 10:
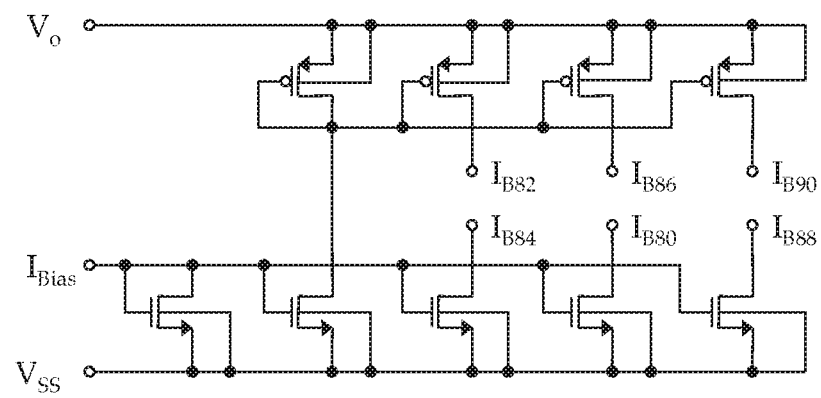
FIG. 10 illustrates, in schematic diagram form, a bias network adapted for use with my 6-diode charge pump shown in FIG. 9.

A complete 6-diode charge pump 16f is shown in FIG. 9 where I have used my custom diode symbols (see, FIG. 6 and FIG. 7). The "flying" capacitors 68 and 74 are preferably implemented as RF varactor capacitors of roughly 1 pF. The bottom-plate parasitic capacitance of these capacitors is coupled to the input ($V_{INP}$) to allow maximum coupling into nodes 92 and 94. This parasitic capacitance will appear directly as an input capacitance term given the much larger decoupling capacitors which provide a return path from $V_{SS}$ to $V_{INN}$. The four large capacitors to $V_{INN}$ (70, 72, 76 and 78) are preferably also implemented as RF varactors to achieve high capacitance density with low series resistance. The size of these "fast" capacitors at the output nodes (between $V_o$ and $V_{INN}$, and $V_{INN}$ and $V_{SS}$) is critical to achieving the best possible efficiency. I have empirically determined that roughly 20 pF each was required to capture 99% of the potential gain and efficiency. Sizing of the diode transistors is a trade-off between the lower V d achieved with increased width versus degradation of the AC coupling into nodes 92 and 94 which occurs with larger devices. The bias network, shown in FIG. 10, runs from a 25 nA input current through 1:1 mirrors to feed the bias transistors—for convenience of reference, I have labeled the bias current supply nodes to indicate an associated one of the diodes in FIG. 9, e.g., node $I_{B8o}$ supplies bias current $I_{Bias}$ for diode 80. The effective bias of the diode transistors (see, FIG. 9) is controlled by scaling of the finger counts of the bias transistors relative to the diode transistors. With my design, the target voltages and load currents can be supported from an input voltage of 520 m $V_P$ (368 m $V_{rms}$) at almost 58% efficiency at room temperature and typical semiconductor manufacturing process.

As will be recognized by those skilled in this art, charge pump 16*f* is a sixth-order pump, developing with respect to node $V_{SS}$ a first stage voltage on node 98, a second stage voltage on node 96, and a third stage voltage on the output node $V_o$. It will also be realized that the second stage voltage is higher than the first stage voltage, and that the third stage voltage is higher than the second stage voltage. If, in a particular application, an intermediate voltage is desired less than $V_o$, then, rather than regulating down from Vo, it will be more power efficient to develop such voltage from either the second stage voltage node 96, i.e., $V_{MID}$, or the first stage voltage node 98, as appropriate.

Figure 11:
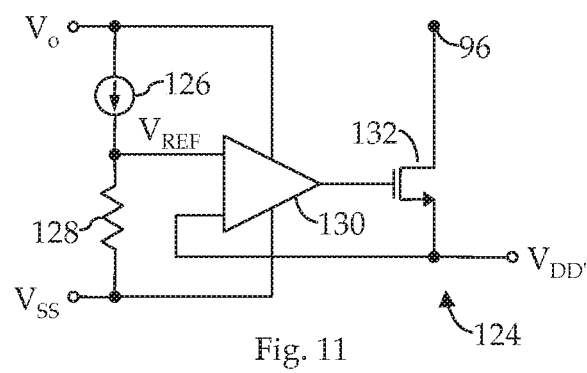
FIG. 11 illustrates, in schematic diagram form, a supplementary DC power source adapted for use with my 6-diode charge pump shown in FIG. 9.

Shown in FIG. 11 is a series-pass regulator 124 adapted in accordance with one embodiment of my invention to develop a supplemental DC supply from the second stage voltage node 96 of the 6-diode charge pump 16*f* illustrated in FIG. 9. I couple between $V_o$ and $V_{SS}$ a small constant-current source 126 in series with a resistor 128 to develop the desired voltage, $V_{REF}$, on one input of an operational amplifier ("op-amp") 130. Applying the output of the op-amp 130 to the gate of an N-channel MOSFET transistor 132 sources the desired supplementary power at node $V_{DD'}$. By feeding back $V_{DD'}$ to the other input of op-amp 130, the gate voltage of transistor 132 will be adjusted until $V_{DD'}$ is substantially equal to the desired $V_{REF}$. Continuing the above example, assume that the desired $V_{REF}$ is 1.0V, then this configuration requires a drop from only 1.2V (the second stage voltage) rather than from 1.8V (the third stage voltage), thereby realizing substantial improvement in overall pump efficiency. Of course, transistor 132 could also be coupled to the second stage voltage node 96, $V_{MID}$ (e.g., 0.9V) or to the first stage voltage node 98 (e.g., 0.6V).

Figure 2:
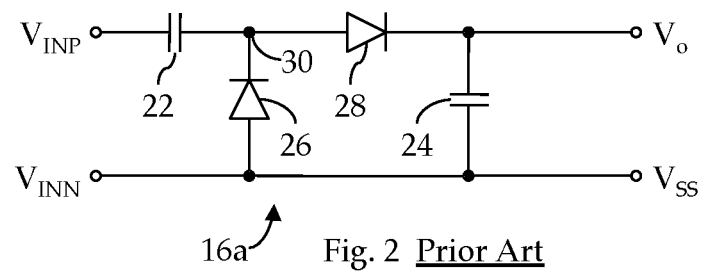
FIG. 2 illustrates, in schematic diagram form, a prior art 2-diode charge pump.
Figure 3:
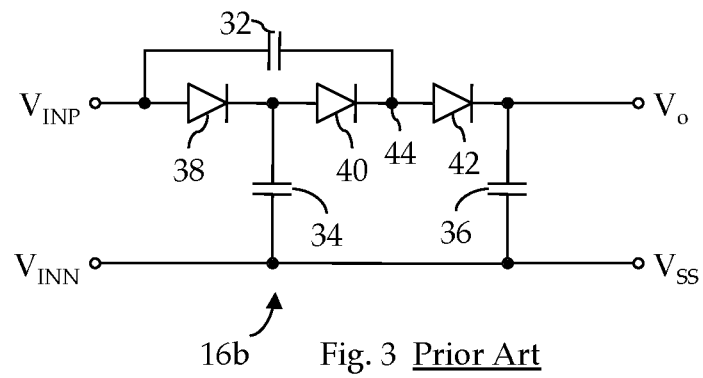
FIG. 3 illustrates, in schematic diagram form, a prior art 3-diode charge pump.

In the description set forth above, I have chosen to disclose my invention in the context of paired back-to-back independent charge pumps, each at least second-order. However, it will be clear to those skilled in this art that my invention can be used effectively in configurations comprising only a single charge pump of second-order or higher. When implementing my invention in such configurations, each diode that has its cathode-end associated with a fixed bias node should be implemented as a P-channel MOSFET diode, and each diode that has its anode-end associated with a fixed bias node should be implemented as an N-channel MOSFET diode. By way of example, in the prior art second-order charge pump shown in FIG. 2, the fixed bias nodes are Vo and $V_{SS}$; and; thus, in accordance with my invention, diode 26 should be implemented as an N-channel MOSFET diode, and diode 28 should be implemented as a P-channel MOSFET diode. In general, therefore, my invention can be applied to any charge pump of second-order or higher, provided that the design incorporates at least one fixed bias node, which will normally be the case.

Thus it is apparent that I have provided an improved AC-to-DC charge pump that provides improved power efficiency while overcoming the problems inherent in prior art charge pumps. Therefore, I intend that my invention encompass all such variations and modifications as fall within the scope of the appended claims.

What is claimed is:
1. An AC-to-DC charge pump comprising:
   a charge pump operable to convert an AC (alternating current) input voltage into a DC (direct current) voltage, wherein the charge pump includes a current-source-biased N-channel MOSFET diode and a current-source-biased P-channel MOSFET diode, wherein the current-source-biased N-channel MOSFET diode includes:
      a first N channel MOSFET;
      a second N channel MOSFET; and
      a capacitor, wherein:
         gates of the first and second N channel MOSFETs are coupled together,
         sources of the first and second N channel MOSFETs are coupled together to provide a cathode of the current-source-biased N-channel MOSFET diode;
         a drain of the first N channel MOSFET is coupled to a common connection of the gates to receive a bias current,
         a drain of the second N channel MOSFET provides an anode of the current-source-biased N-channel MOSFET diode; and
         the capacitor is coupled between the drain of the second N channel MOSFET and the common connection of the gates; and
   a complimentary charge pump operable to convert the AC input voltage into a complimentary DC voltage, wherein a magnitude of the DC voltage is substantially equal to a magnitude of the complimentary DC voltage, wherein the charge pump is coupled to the complimentary charge pump to add the DC voltage and the complimentary DC voltage to produce an output voltage, which has a middle rail that is coupled to a negative leg ($V_{INN}$) of the AC input voltage, wherein the middle rail has a common-mode voltage ($V_{MID}$), and wherein the common: mode voltage is shared by the negative leg and a positive leg ($V_{INP}$) of the AC input voltage.
2. The charge pump of claim 1 wherein the charge pump comprises:
   an input capacitor;
   a first diode circuit as the current-source-biased N-channel MOSFET diode;
   a second diode circuit as the current-source-biased P-channel MOSFET diode; and
   an output capacitor, wherein a first node of the input capacitor is coupled to the positive leg of the AC input voltage ($V_{INP}$), wherein a second node of the input capacitor is coupled to a flying node, wherein a cathode of the first diode circuit is coupled to the flying node and an anode of the first diode circuit is coupled to the middle rail, wherein an anode of the second diode circuit is coupled to the flying node and a cathode of the second diode circuit is coupled to an output node, and wherein a first node of the output capacitor is coupled to the output node and a second node of the output capacitor is coupled to the middle rail.

3. The charge pump of claim 2 wherein the current-source-biased P-channel MOSFET diode comprises:
a first P channel MOSFET;
a second P channel MOSFET; and
a capacitor, wherein:
gates of the first and second P channel MOSFETs are coupled together,
sources of the first and second P channel MOSFETs are coupled together to provide a cathode of the second diode circuit;
a drain of the first P channel MOSFET is coupled to a common connection of the gates of the first and second P channel MOSFETs to receive a bias current, and
a drain of the second P channel MOSFET provides an anode of the second diode circuit; and
the capacitor is coupled between the common connection of the sources and the common connection of the gates.

4. The charge pump of claim 1 wherein the complimentary charge pump comprises:
an input capacitor;
a first diode circuit;
a second diode circuit; and
an output capacitor, wherein a first node of the input capacitor is coupled to the positive leg of the AC input voltage ($V_{INP}$), wherein a second node of the input capacitor is coupled to a flying node, wherein an anode of the first diode circuit is coupled to the flying node and a cathode of the first diode circuit is coupled to the middle rail, wherein a cathode of the second diode circuit is coupled to the flying node and an anode of the second diode circuit is coupled to an output node ($V_{SS}$), and wherein a first node of the output capacitor is coupled to the output node and a second node of the output capacitor is coupled to the middle rail.

5. The charge pump of claim 4 further comprises:
the second diode circuit including a second current-source-biased N-channel MOSFET diode; and
the first diode circuit including a second current-source-biased P-channel MOSFET diode.

6. An integrated system comprising:
an antenna;
a tank circuit coupled to the antenna;
an AC-to-DC charge pump circuit coupled to the tank circuit, wherein the AC-to-DC charge pump circuit includes:
a charge pump operable to convert an AC (alternating current) input voltage received via the antenna into a DC (direct current) voltage, wherein the charge pump includes a current-source-biased N-channel MOSFET diode and a current-source-biased P-channel MOSFET diode, wherein the current-source-biased N-channel MOSFET diode includes:
a first N channel MOSFET;
a second N channel MOSFET; and
a capacitor, wherein:
gates of the first and second N channel MOSFETs are coupled together,
sources of the first and second N channel MOSFETs are coupled together to provide a cathode of the current-source-biased N-channel MOSFET diode;
a drain of the first N channel MOSFET is coupled to a common connection of the gates to receive a bias current,
a drain of the second N channel MOSFET provides an anode of the current-source-biased N-channel MOSFET diode; and
the capacitor is coupled between the drain of the second N channel MOSFET and the common connection of the gates; and
a complimentary charge pump operable to convert the AC input voltage into a complimentary DC voltage, wherein a magnitude of the DC voltage is substantially equal to a magnitude of the complimentary DC voltage and wherein the charge pump is coupled to the complimentary charge pump to add the DC voltage and the complimentary DC voltage to produce an output voltage, which has a middle rail that is coupled to a negative leg ($V_{INN}$) of the AC input voltage, wherein the middle rail has a common-mode voltage ($V_{MID}$), and wherein the common: mode voltage is shared by the negative leg and a positive leg ($V_{INP}$) of the AC input voltage.

7. The integrated system of claim 6, wherein the charge pump circuit comprises:
an input capacitor;
a first diode circuit as the current-source-biased N-channel MOSFET diode;
a second diode circuit as the current-source-biased P-channel MOSFET diode; and
an output capacitor, wherein a first node of the input capacitor is coupled to the positive leg of the AC input voltage ($V_{INP}$), wherein a second node of the input capacitor is coupled to a flying node, wherein a cathode of the first diode circuit is coupled to the flying node and an anode of the first diode circuit is coupled to the middle rail, wherein an anode of the second diode circuit is coupled to the flying node and a cathode of the second diode circuit is coupled to an output node ($V_O$), and wherein a first node of the output capacitor is coupled to the output node and a second node of the output capacitor is coupled to the middle rail.

8. The integrated system of claim 7 further comprises:
the current-source-biased P-channel MOSFET diode includes:
a first P channel MOSFET;
a second P channel MOSFET; and
a second capacitor, wherein:
gates of the first and second P channel MOSFETs are coupled together,
sources of the first and second P channel MOSFETs are coupled together to provide a cathode of the second diode circuit;
a drain of the first P channel MOSFET is coupled to a common connection of the gates of the first and second P channel MOSFETs to receive a bias current, and
a drain of the second P channel MOSFET provides an anode of the second diode circuit; and
the second capacitor is coupled between the common connection of the sources of the first and second P channel MOSEFTs and the common connection of the gates of the first and second P channel MOSEFTs.

9. The integrated system of claim 7, wherein the complimentary charge pump comprises:
an input capacitor;
a first diode circuit;
a second diode circuit; and
an output capacitor, wherein a first node of the input capacitor is coupled to the positive leg of the AC input voltage ($V_{INP}$), wherein a second node of the input capacitor is coupled to a flying node, wherein an anode of the first diode circuit is coupled to the flying node and a cathode of the first diode circuit is coupled to the middle rail, wherein a cathode of the second diode circuit is coupled to the flying node and an anode of the second diode circuit is coupled to an output node ($V_{SS}$), and wherein a first node of the output capacitor is coupled to the output node and a second node of the output capacitor is coupled to the middle rail.

10. The integrated system of claim 9 further comprises:
the first diode circuit including a second current-source-biased P-channel MOSFET diode; and
the second diode circuit including a second current-source-biased N-channel MOSFET diode.

* * * * *